United States Patent
Fernandez et al.

(10) Patent No.: US 7,244,348 B2
(45) Date of Patent: Jul. 17, 2007

(54) SYSTEM AND METHOD FOR TREATMENT OF BALLAST WATER

(75) Inventors: Randolfo Fernandez, Houston, TX (US); David W. Hill, Sugar Land, TX (US); Rudolf C. Matousek, Richmond, TX (US); James B. Moore, Katy, TX (US)

(73) Assignee: Severn Trent de Nora, LLC, Sugar Land, TX (US)

( * ) Notice: Subject to any disclaimer, the term of this patent is extended or adjusted under 35 U.S.C. 154(b) by 70 days.

(21) Appl. No.: 11/037,642

(22) Filed: Jan. 18, 2005

(65) Prior Publication Data

US 2006/0113257 A1 Jun. 1, 2006

Related U.S. Application Data

(60) Provisional application No. 60/631,453, filed on Nov. 29, 2004.

(51) Int. Cl.
  *C02F 1/46* (2006.01)
(52) U.S. Cl. ............... 205/701; 205/742; 205/500; 204/228.6; 204/275.1
(58) Field of Classification Search ......... 205/701, 205/742, 500; 204/228.6, 275.1
  See application file for complete search history.

(56) References Cited

U.S. PATENT DOCUMENTS

| | | | | |
|---|---|---|---|---|
| 4,097,358 A | | 6/1978 | Wiseman | |
| 4,248,690 A | * | 2/1981 | Conkling | 204/268 |
| 4,767,511 A | * | 8/1988 | Aragon | 210/743 |
| 5,816,181 A | | 10/1998 | Sherman, Jr. | |
| 6,125,778 A | | 10/2000 | Rodden | |
| 6,516,738 B2 | | 2/2003 | Cannon | |
| 6,632,347 B1 | * | 10/2003 | Buckley et al. | 205/620 |
| 6,773,607 B2 | | 8/2004 | Russell | |
| 6,773,611 B2 | | 8/2004 | Perlich et al. | |
| 6,923,901 B2 | * | 8/2005 | Leffler et al. | 205/701 |
| 2003/0066758 A1 | * | 4/2003 | Bess et al. | 205/556 |

\* cited by examiner

*Primary Examiner*—Arun S. Phasge
(74) *Attorney, Agent, or Firm*—D'Ambrosio & Associates, P.L.L.C.; Jo Katherine D'Ambrosio

(57) ABSTRACT

A system and method for treating ballast water within an ocean going vessel by generating hypochlorite for treating the ballast water. The system comprises one or more hypochlorite electrolytic cells in fluid communication with a stream of ballast water. A chlorine analyzer is positioned downstream from the electrolytic cells to determine the chlorine concentration of the treated ballast water. A hydrogen separator is connected to the hypochlorite electrolytic cells for venting hydrogen. In the method of this invention, water is taken aboard the ship for ballast in one port. A treatment stream is separated from the ballast water stream and piped to hypochlorite electrolytic cells. Hypochlorite is generated into the treatment stream and the hydrogen byproduct is separated by the hydrogen separators. The treatment stream is then reintroduced to the ballast water to eliminate marine species and pathogenic bacteria from ballast water. The ballast water undergoes de-chlorination prior to being discharged into a new port.

36 Claims, 4 Drawing Sheets

SYSTEM AND METHOD FOR TREATMENT OF BALLAST WATER

This application claims the benefit of U.S. Provisional Application No. 60\631,453 filed Nov. 29, 2004.

FIELD OF THE INVENTION

The method of this invention relates generally to a system and method for the treatment of ballast water to eliminate marine species and pathogenic bacteria from ballast water. More particularly, the system and method of this invention treats ballast water with hypochlorite produced on-site.

BACKGROUND OF THE INVENTION

Ballast water is used to balance the weight distribution in a marine vessel. Ballast water is pumped into tanks where it is stored to properly balance a vessel for a voyage. Often ballast water is taken on at one port and transported to another where it is emptied into the new port. This common practice has an inherent danger. Releasing the ballast water taken aboard from a distant location can be both harmful to the environment and dangerous to human and animals in a new port.

The introduction of non-native marine life into a new ecosystem can have a devastating effect on the native flora and fauna which may not have natural defenses to the new species. Additionally, harmful bacterial pathogens, such as cholera, may be present in the origination port. These pathogens can multiply in the ballast tanks over time and cause an outbreak of illness in the area where they are released.

The dangers posed by the marine life and pathogens may be controlled by killing those species present in the ballast water. For the past century, chlorination has become the standard way to disinfect water supplies, potable water, wastewater and swimming pools, for example, to eliminate epidemics of waterborne diseases.

SUMMARY OF THE INVENTION

The present invention provides a system and method for treating ballast water in a marine vessel. Ballast water is piped onto a vessel in one port or harbor and discharged upon reaching another port. On-site hypochlorite generation allows the ballast water to be treated on board the vessel before the ballast water is released in a distant port. Treating the ballast water with hypochlorite generated from the ballast water itself eliminates many of the marine organisms and bacteria which may be transported from the first port and propagated within the ballast water tanks. The elimination of these organisms in turn eliminates the introduction of non-native marine species into the water, and prevents outbreaks of water born diseases such as cholera. Additionally, the system and method of this invention provides a mechanism for separating and releasing the potentially dangerous hydrogen byproduct of the hypochlorite generation. Finally, the treated ballast water undergoes a de-chlorination process to remove any residual chlorine prior to discharging the treated ballast water into a new harbor.

In general in one aspect of this invention, the ballast water treatment system comprises one or more hypochlorite electrolytic cells adapted to receive a stream of ballast water and a chlorine analyzer in fluid communication with the ballast water stream. The system may further comprise one or more hydrogen separators in fluid communication with the hypochlorite electrolytic cells. The hydrogen separator can comprise a hydrocyclonic separator.

In one embodiment, each hypochlorite electrolytic cell comprises a tubular cell, the tubular cell comprising an outer monopolar tube and an inner bipolar tube. The ballast water treatment system can further comprise a sulfite auxiliary system to neutralize residual chlorine prior to discharging treated ballast water into a new harbor so that the chlorine doesn't destroy indigenous flora and fauna. The sulfite auxiliary system is positioned downstream from the one or more hypochlorite electrolytic cells.

In another preferred embodiment, the ballast water treatment system can comprise one or more ballast water tanks, one or more hypochlorite electrolytic cell, a chlorine analyzer, one or more hypochlorite electrolytic cells, and one or more hydrogen separators connected to the one or more hypochlorite electrolytic cells. The hypochlorite electrolytic cells are adapted to receive a stream of ballast water. The chlorine analyzer is positioned downstream from the one or more hypochlorite electrolytic cells.

The ballast water treatment system can further comprise piping adapted to transport ballast water to one or more ballast water tanks, and side stream piping. The side stream piping is in fluid communication with the piping adapted to transport ballast water to one or more ballast water tanks. The side stream piping is adapted to transport a portion of the ballast water to and from the one or more hypochlorite electrolytic cells.

Preferably, the hypochlorite electrolytic cells are adapted to electrolyze seawater. In one embodiment, the chlorine analyzer is in fluid communication with the piping.

In one embodiment, the chlorine analyzer comprises a sampling unit to measure the amount of chlorine in the ballast water and a signal unit to emit an electrical signal to the one or more electrolytic cells to modulate hypochlorite production.

The ballast water treatment system can further comprise a booster pump upstream from the one or more hypochlorite electrolytic cells. The booster pump increases the pressure of water piped through the ballast water treatment system. Alternatively, the booster pump is connected to the side stream piping downstream from the one or more hypochlorite electrolytic cells to increase the pressure of water piped through the ballast treatment system. Preferably, the one or more hydrogen separators comprise a means for venting hydrogen to the atmosphere.

In another preferred embodiment, a filter is connected to the piping upstream from the side stream piping leading to the one or more hypochlorite electrolytic cells to filter ballast water prior to the water entering the one or more hypochlorite electrolytic cells. Preferably, the filter comprises a 50-micron self-cleaning filter.

In another embodiment, each hypochlorite electrolytic cell comprises a tubular cell, the tubular cell comprising an outer monopolar tube and an inner bipolar tube.

In another embodiment of the invention, the ballast water treatment system further comprises a de-chlorination system to neutralize residual chlorine. The de-chlorination system can be positioned downstream from the ballast water tanks. Preferably, the de-chlorination system is a sulfite auxiliary system. The sulfite auxiliary system preferably comprises a sulfite tank, a pump, and a sulfite analyzer.

In an alternative embodiment, the de-chlorination system comprises a means for mixing the ballast water with water comprising Biological Oxygen Demand (BOD) content. The water comprising BOD content can be seawater. In one embodiment, the means for mixing the ballast water with water containing BOD content comprises an eductor. Alternatively, the means for mixing the ballast water with water having BOD content comprises a pump system adapted to pipe the water containing BOD to a mixing point adjacent to the ballast tank.

In another preferred embodiment of the invention, the ballast water treatment system comprises one or more hypochlorite electrolytic cells, a chlorine analyzer, a means for venting hydrogen, piping, side stream piping, and a booster pump. The chlorine analyzer is positioned downstream from the one or more hypochlorite electrolytic cells. The piping is adapted to transport ballast water to one or more ballast tanks. The side stream piping is in fluid communication with the piping. The side stream piping is adapted to transport a portion of the ballast water to and from the one or more hypochlorite electrolytic cells. The booster pump is connected to the side stream piping to increase the pressure of water piped through the ballast treatment system.

In another embodiment, the chlorine analyzer is in fluid communication with the piping. Preferably, the means for venting hydrogen comprises a vent in the ballast tank. The ballast water treatment system can further comprise a filter connected to the piping upstream from the entrance to the side stream piping.

In another embodiment of the invention, each hypochlorite electrolytic cell comprises a tubular cell, the tubular cell comprising an outer monopolar tube and an inner bipolar tube.

In another aspect of the invention, the ballast water treatment system further comprising a sulfite auxiliary system to neutralize residual chlorine, the sulfite auxiliary system positioned downstream from the one or more hypochlorite electrolytic cells. Alternatively, the ballast water treatment system comprises a means for mixing the ballast water with water having BOD content to neutralize residual chlorine prior to discharging ballast water. The water having BOD content can be seawater. The means for mixing the ballast water with water having BOD content can comprise an eductor. Alternatively, the means for mixing the ballast water with water having BOD content can comprise a pump system adapted to pipe the water having BOD content to a mixing point adjacent to the ballast tank.

In another embodiment of the invention, the system for treating ballast water comprises one or more hypochlorite electrolytic cells, a chlorine analyzer, a means for venting hydrogen, and a sulfite auxiliary system. The chlorine analyzer is positioned downstream from the one or more hypochlorite electrolytic cells. The means for venting hydrogen is connected to the one or more hypochlorite electrolytic cells. The sulfite auxiliary system is positioned downstream from the one or more hypochlorite electrolytic cells to neutralize residual chlorine.

Preferably, the means for venting hydrogen comprises a hydrogen separator. In another embodiment of the system, the chlorine analyzer comprises a sampling unit to measure the amount of chlorine in the ballast water and a signal unit to emit an electrical signal to the one or more electrolytic cells when additional hypochlorite is required. Preferably, the sulfite auxiliary system comprises a sulfite tank, a diaphragm pump and a sulfite analyzer. In another embodiment, a filter is positioned upstream from the hypochlorite electrolytic cells to filter water prior to entering the one or more hypochlorite electrolytic cells.

In another embodiment of the invention, the system for treating ballast water on board a marine vessel comprises one or more hypochlorite electrolytic cells, piping, side stream piping, a booster pump, a chlorine analyzer, a means for venting hydrogen to the atmosphere, a sulfite auxiliary system, and a filter.

The piping is adapted to transport ballast water onto a marine vessel. The side stream piping is in fluid communication with the piping and adapted to transport a portion of the ballast water to and from the one or more hypochlorite electrolytic cells. The booster pump is connected to the side stream piping to increase the pressure of water piped through the ballast water treatment system. The chlorine analyzer is positioned downstream from the one or more hypochlorite electrolytic cells. The chlorine analyzer comprises a sampling unit to measure the amount of chlorine in the ballast water and a signal unit to emit an electrical signal to the one or more electrolytic cells when additional hypochlorite is required. The hydrogen separator comprises a means for venting hydrogen to the atmosphere. The sulfite auxiliary system is positioned downstream from the one or more hypochlorite electrolytic cells to neutralize residual chlorine. The filter is connected to the piping.

In yet another embodiment of the system for treating ballast water, the system comprises one or more hypochlorite electrolytic cells, a chlorine analyzer positioned downstream from the one or more hypochlorite electrolytic cells, a means for venting hydrogen; and a de-chlorination system. The de-chlorination system comprises a means for mixing the ballast water with water having BOD content to neutralize residual chlorine.

In one embodiment of the invention, the water comprising BOD content is seawater. In another embodiment of the invention, the means for mixing the ballast water with water containing BOD content comprises an eductor. Alternatively, the means for mixing the ballast water with water having BOD content comprises a pump system adapted to pipe the water containing BOD content to a mixing point adjacent the ballast tank.

Generally, the method for treating ballast water comprises drawing a ballast water stream into one or more ballast water tanks. A portion of the ballast water stream is removed to form a treatment stream. The Current is then applied to the one or more hypochlorite electrolytic cells to produces hypochlorite within the treatment stream. The resulting hydrogen is removed from the treatment stream. Finally, the treatment stream is reintroduced into the ballast water stream.

Another embodiment of this method further comprises the step of increasing the pressure of the treatment stream with a pump. Preferably, the ballast water stream is filtered prior to the removal of the treatment stream. In one embodiment, hydrogen is separated from the treatment stream by a hydrocyclone separator.

In another embodiment, the ballast water stream is sampled after the treatment stream is reintroduced to the main stream to determine the chlorine concentration of the ballast water stream. Preferably, the chlorine concentration of the of the ballast water stream is measured by a chlorine analyzer and the current in the one or more hypochlorite electrolytic cells is adjusted in response to the measured chlorine concentration to increase or decrease the hypochlorite generated in the treatment stream. Preferably, the electrolytic cells use seawater to generate hypochlorite in the treatment stream.

In another embodiment, residual chlorine in the ballast water stream is neutralized with sulfite downstream from the one or more hypochlorite electrolytic cells. Alternatively, residual chlorine in the ballast water stream is neutralized by piping sulfite chemical directly into the ballast water tank to de-chlorinate the ballast water prior to discharge.

In another aspect of the method, residual chlorine is neutralized with a means for mixing the ballast water with water having BOD content prior to discharging ballast water. In one embodiment of the method, the means for mixing the ballast water with water having BOD content comprises an eductor. In another embodiment of the method, the means for mixing the ballast water with water having BOD content comprises a pump system adapted to pipe the water having BOD content to a mixing point adjacent to the ballast tank. In another aspect of the method, the water having BOD content is seawater.

In another embodiment of the method of this invention, a ballast water stream is drawn onto the vessel. The ballast water stream is then filtered. Next, a portion of the filtered ballast water stream is removed to form a treatment stream, and the pressure of the treatment stream is increased. In an alternative embodiment, the filtered ballast water is sent directly to the ballast tanks prior to treatment using the system and method of this invention. The treatment stream in then piped to one or more hypochlorite electrolytic cells. Current is applied to the one or more hypochlorite electrolytic cells to produce hypochlorite within the treatment stream. The resulting hydrogen is separated from the treatment stream by a means for venting. The treatment stream is reintroduced into the ballast water stream. The ballast water stream is sampled after the treatment stream is reintroduced to determine the chlorine concentration of the ballast stream. The current in the one or more hypochlorite electrolytic cells is adjusted in response to the measured chlorine concentration to increase or decrease the hypochlorite generated in the treatment stream. Finally, residual chlorine in the ballast water stream is neutralized downstream from the one or more hypochlorite electrolytic cells with sulfite.

In another embodiment of this method, the hydrogen is separated from the treatment stream by a hydrocyclone separator. Alternatively, the means for venting hydrogen comprises venting the ballast water tank to the atmosphere.

In another embodiment of the method, the step of neutralizing residual chlorine comprises piping the ballast water stream to a sulfite auxiliary system, the sulfite auxiliary system positioned downstream from the ballast water tanks.

In yet another embodiment of the method for treating ballast water, the method is comprised of first drawing a ballast water stream into one or more ballast tanks. Next, a portion of the ballast water is removed to form a treatment stream. The treatment stream is then piped to one or more hypochlorite electrolytic cells. Current is applied to the one or more hypochlorite electrolytic cells to produce hypochlorite within the treatment stream. The resulting hydrogen is separated from the treatment stream. The treatment stream is then reintroduced to the ballast water stream. In one embodiment, the treatment stream can be reintroduced to the ballast water stream before the ballast water stream enters the ballast tanks.

Finally, residual chlorine in the ballast water stream is neutralized downstream from the one or more hypochlorite electrolytic cells with a means for mixing the ballast water with water having BOD content prior to discharging ballast water.

The method can further comprise the step of increasing the pressure of the treatment stream with a booster pump.

[0035] In another embodiment, the ballast water stream is sampled after the treatment stream is reintroduced to determine the chlorine concentration of the ballast water stream.

The chlorine concentration of the of the ballast water stream may be measured by a chlorine analyzer and the current in the one or more hypochlorite electrolytic cells can be adjusted in response to the measured chlorine concentration to increase or decrease the hypochlorite generated in the treatment stream.

In a further embodiment of the method, the residual chlorine in the treated ballast water stream is neutralized with sulfite downstream from the one or more hypochlorite electrolytic cells.

In another embodiment of the method of this invention, residual chlorine in the treated ballast water is removed by mixing the ballast water with water having BOD content. Preferably, the water with BOD content is seawater. In still another embodiment, the means for mixing the ballast water with water having BOD content comprises an eductor. Alternatively, the means for mixing the ballast water with water having BOD content comprises a pump system adapted to pipe the water having BOD content to a mixing point adjacent to the ballast tank.

DETAILED DESCRIPTION

The present invention provides a system and method for treating ballast water. One preferred on-site reaction for creating sodium hypochlorite (NaOCl) is illustrated in the following equation:

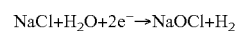
$$NaCl+H_2O+2e^- \rightarrow NaOCl+H_2$$

Figure 1:
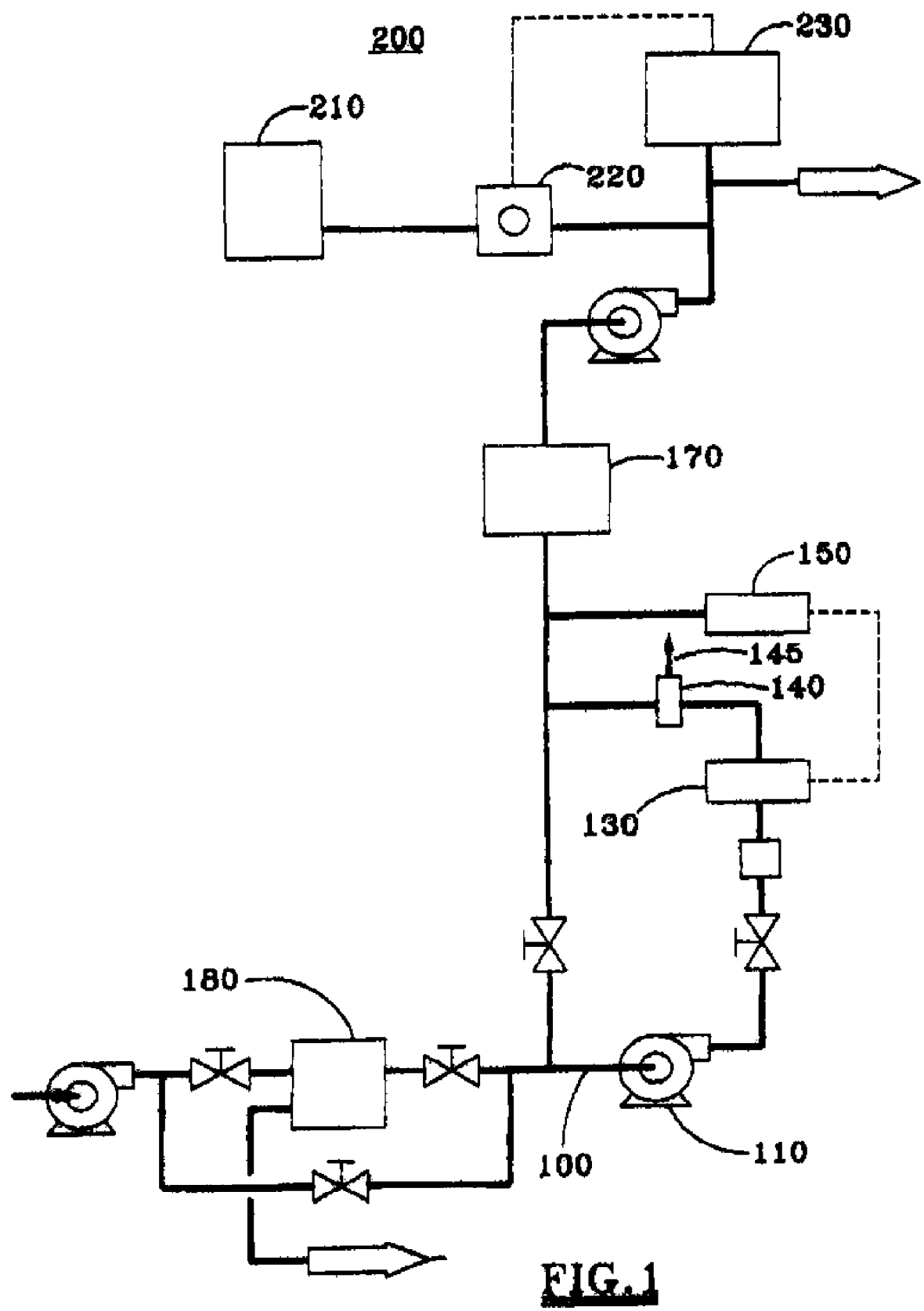
FIG. 1 is a schematic of this invention's system for treating ballast water.

Referring to the FIG. 1, in one preferred embodiment of the invention in which the ballast water is treated on-site, water is pumped on board a marine vessel, a ship or oil rig, for example. The water is either seawater with natural salt content or freshwater. In one embodiment, a side stream of ballast water is separated from the main water stream going to the ballast tanks 170. In an alternative embodiment, the side stream is drawn from the ballast water tanks 170 after the main ballast water stream has entered the ballast water tanks 170. The side stream flows through the side stream piping 100 to one or more hypochlorite electrolytic cells 130 where hypochlorite is generated either from the salt naturally present in the ballast water, if seawater, or from added chloride salts if fresh water. Seawater is used for the purposes of this description, but this invention is not limited to seawater. Any chlorine-generating salt water may be used.

The one or more electrolytic cells are equipped with electrodes energized under direct anodic and cathodic current. In this condition, partial electrolysis of sodium chloride (NaCl) contained in raw seawater occurs. The aqueous solution of sodium chloride (NaCl), which is completely dissociated as sodium ion (Na+) and chlorine ion (Cl−), reacts at the anode to generate free chlorine. The hydroxide ions (OH−) in the water migrate from the cathodic area and react with Na+ and $Cl_2$ near the anode to produce sodium hypochlorite (NaOCl) and hydrogen ($H_2$).

The water then flows into a hydrogen separator 140 where the hydrogen byproduct ($H_2$) of the hypochlorite generation is separated from the side stream. The side stream is then reintroduced to the ballast water stream to kill marine organisms and bacteria in the ballast water tanks.

In one embodiment of the invention, the hydrogen separator 140 can comprise a hydrocyclone separator. The hydrogen separator 140 can also comprise a means for venting hydrogen to the atmosphere 145. Separating hydrogen from the water stream is important, as hydrogen is highly flammable. Hydrogen is flammable in air in concentrations as low as 4.1% and as high as 74%. Without the use of a hydrogen separator 140, it is possible for hydrogen to be introduced into the ballast water tanks where it could potentially reach hydrogen-air concentrations in the flammability range.

One hydrocyclone separator 140 of this invention comprises a cylindrical top section and a conical bottom section. Water from the one or more electrolytic cells, containing hydrogen, enters the side of the top section. The hydrogen exits the top of the separator, while the water exits the bottom. The water enters tangentially to the side of the cylindrical section so that the water travels in a circular path around the cylindrical and conical sections before flowing out the bottom of the separator, facilitating the separation of the water and hydrogen.

In another embodiment of the invention, a chlorine analyzer 150, in fluid communication with the ballast water stream, measures the chlorine content of the ballast water. The chlorine analyzer 150 can be positioned downstream from the one or more electrolytic cells 130. In one aspect, the chlorine analyzer 150 is positioned downstream from the point where the chlorinated side stream (treatment stream) reenters the ballast water stream. The chlorine analyzer 150 may further comprise a sampling unit that modulates the hypochlorite content in ballast water by measuring the chlorine level in the water and emitting a signal to the electrolytic cells 130 to adjust the amount of hypochlorite generated in the side stream relative to a predetermined concentration in the ballast tank and piping. The chlorine analyzer 150 functions by taking a sample and mixing it with an acidic iodide or potassium iodide reagent. The chlorine present in the sample oxidizes the iodide to iodine. The liberated iodine is measured by a membrane-covered, amperometric type sensor. The level of iodine is proportional to the total chlorine concentration in the sample.

In another alternative embodiment of this invention, a filter 180 is present and in fluid communication with the ballast water stream. The filter can be positioned upstream from the side stream leading to the one or more electrolytic cells to remove debris from the side stream. The filter is preferably a 50-micron self-cleaning filter. A self-cleaning filter measures the pressure differential across the filter. As the filter screen becomes clogged with the debris removed by the filter, the pressure differential increases. Once the pressure differential reaches a certain setpoint or a predetermined amount of time has lapsed, the filter screen is cleaned by a suction scanner with nozzles that spiral across the inner surface of the screen. The filtration debris is vacuumed from the screen and expelled out the exhaust valve.

In another embodiment of the invention, the hypochlorite electrolytic cell comprises a tubular cell. The tubular cell comprises an outer monopolar tube and inner bipolar tube. The hypochlorite electrolytic cell can also comprise other types of electrolytic cells. Many types of hypochlorite electrolytic cells are known within the on-site, electrochlorination industry. Other types of electrolytic cells include a plate type hypochlorite generator. The electrolytic cell is selected because of its configuration of connection nodes to the electrodes and the hydraulic flow of liquid throughout the cell.

In still another embodiment of the invention, a booster pump 110 is connected to the side stream piping 100 to increase the pressure of water through the ballast water treatment system. Increased pressure is necessary because a substantial pressure drop occurs as the side stream passes through the hypochlorite electrolytic cells 120, which must be compensated for in order to allow the side stream to be reintroduced into the ballast water stream. The booster pump 100 can be positioned either upstream or downstream from the hypochlorite electrolytic cells 120.

Ballast water is typically taken aboard in one port or harbor and then released at the next harbor. Residual chlorine in the ballast water tanks that is not consumed in the treatment of the ballast water is potentially harmful to the marine ecosystem in the new harbor where the ballast water is discharged. The residual chlorine could kill native flora and fauna in the ecosystem. Consuming or neutralizing this residual chlorine immediately prior to discharging the ballast water protects against damage which the residual chlorine would cause. In one embodiment of the invention, a de-chlorination system 200 can be added to neutralize residual chlorine in the ballast water tank 170 before the ballast water is released from the vessel into the port, ocean, lake, or river. The de-chlorination system can be positioned downstream from the ballast tanks. In one embodiment illustrated in FIG. 1, the de-chlorination system can comprise a sulfite auxiliary system. The sulfite auxiliary system 200 can comprise a sulfite tank 210, a pump 220, and a sulfite analyzer 230. In one aspect the pump of the sulfite auxiliary system 200 is a diaphragm-metering pump. The diaphragm metering pump controls the flow of sulfite used to neutralize residual chlorine.

The sulfite auxiliary system 200 removes residual chlorine by reacting the chlorine with sulfur dioxide gas, a solution of sodium bisulfite, or sodium sulfate. The residual chlorine is consumed in the following reaction:

$$Na_2SO_3 + Cl_2 + H_2O \rightarrow Na_2SO_4 + 2HCl$$

So long as excess sulfite ions are present in the effluent, effectively no chlorine is present. The sulfite analyzer converts the sulfite ions in the treated water sample to sulfur dioxide by mixing the sample with acid. The sulfur dioxide is then stripped from the sample and measured by a gas sensor. The analyzer 230 provides a control output to control the feed from the sulfite tank to de-chlorinate the ballast water stream.

Figure 2:
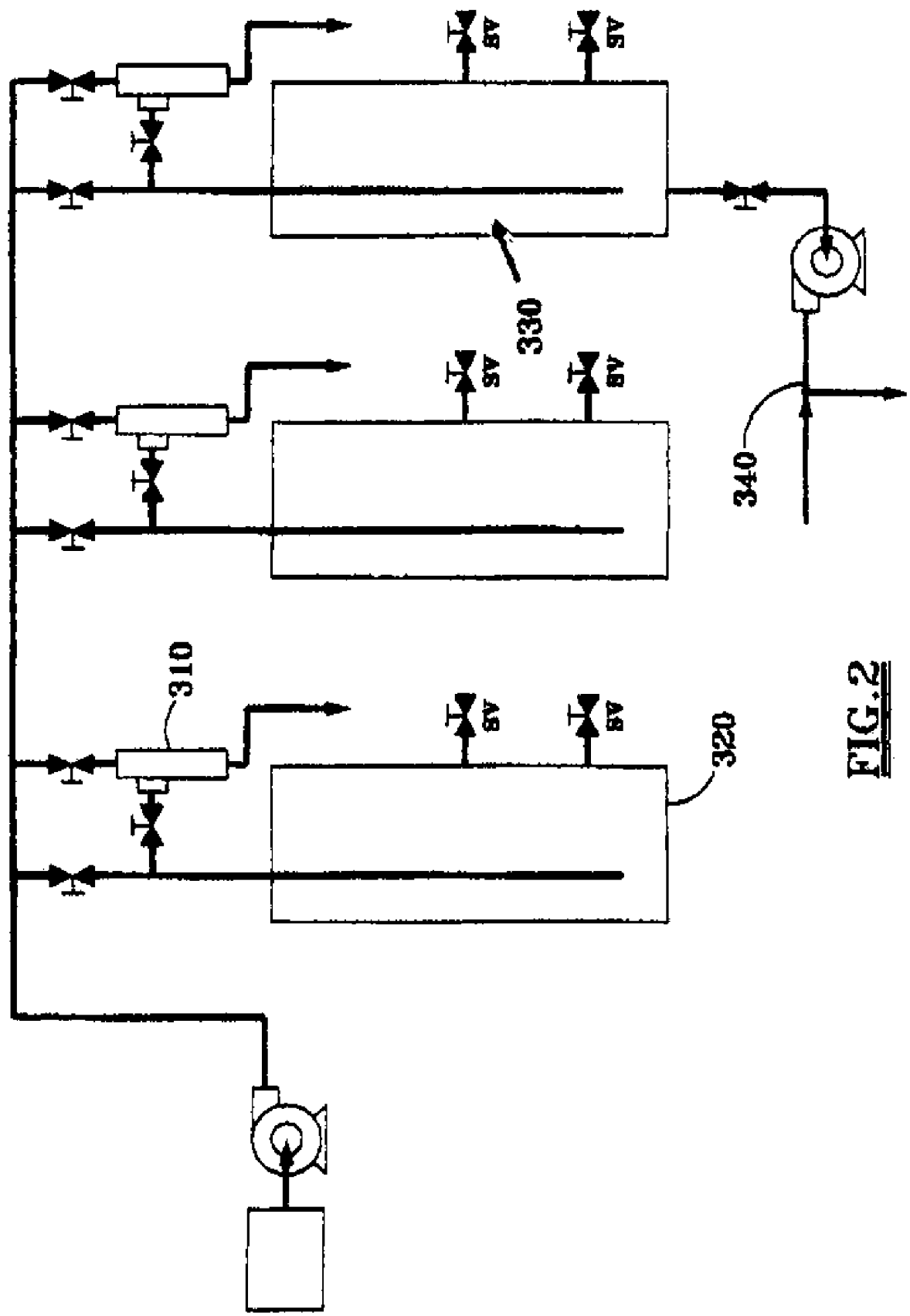
FIG. 2 is a schematic of this invention's system for neutralizing chlorine

In an alternative embodiment of the invention as seen in FIG. 2, residual chlorine can be rendered innocuous by reacting the chlorine with organisms in seawater. In lieu of neutralizing residual chlorine with sodium sulfite or another stored chemical, microorganisms in seawater may be used without the necessity of carrying and maintaining stores of chlorine neutralizing chemicals.

Seawater has a natural biological oxygen demand (BOD) that can be utilized to remove chlorine from the ballast water. Experimental results, reported below and illustrated in FIGS. 3 and 4, reveal that seawater has an immediate reaction with chlorine. The total residual oxidant content of the ballast water is reduced immediately when seawater is mixed with the ballast water.

The benefits in reacting the seawater with the ballast water on board the vessel are first that seawater eliminates the need to carry chemicals on board the ship, and second, residual chlorine, is rendered innocuous in a controlled environment. Simply releasing the chlorine with the ballast water allows the chlorine to react without any controls. Neutralizing the chlorine on board means chlorine cannot settle in one potentially sensitive area.

Referring now to FIG. 2, in one preferred embodiment of de-chlorination with water having BOD content, seawater is pumped on board the vessel and through an eductor 310. The pressure drop in the eductor 310 draws ballast water from the ballast water tank 220. The ballast water 330 mixes with the seawater in the eductor 310. Residual chlorine is immediately rendered innocuous by the seawater. After mixing, the seawater and de-chlorinated ballast water are piped overboard where they can be safely released within the harbor without harming indigenous marine life.

In an alternative embodiment of the invention as shown FIG. 2, additional seawater is taken on board the vessel where it is mixed with previously treated ballast water at a mixing point 340 adjacent to the ballast water tank 330. Any residual chlorine in the ballast water reacts with the BOD content in the seawater to render the residual chlorine innocuous within the controlled environment of the ballast water tank. The mixture of de-chlorinated ballast water and seawater is then released.

In one embodiment of a method of this invention, ballast water is treated by first drawing a ballast water stream on board the vessel. The ballast water stream may then be filtered. A portion of the filtered ballast water stream is drawn off through the side stream piping 100 to form a treatment stream. This treatment stream is piped to hypochlorite electrolytic cells, where a current is applied to the cells to produce hypochlorite within the treatment stream. Hydrogen, which is flammable, is separated from the treatment stream before the treatment stream is reintroduced into the main ballast water stream. The ballast water stream containing the hypochlorite is sampled after the treatment stream is reintroduced the ballast water stream to determine the chlorine concentration of the ballast water stream.

In one aspect of the method of this invention, the treatment stream is removed from the ballast water stream before the stream enters the ballast water tank. Alternatively, the treatment stream is drawn off of the ballast water tanks. The treatment stream is then treated with hypochlorite and reintroduced into the ballast water stream before the stream enters the ballast water tank. The hypochlorite electrolytic cells use natural salt water when the ballast water tanks take on seawater, to generate hypochlorite in the treatment stream. Alternatively, if fresh water is used as ballast water, a sodium chloride salt can be added to the fresh water to supply the chloride ion.

In an alternative embodiment of the method, the pressure of the treatment stream, which drops as the stream enters the side stream piping 100, is increased with a pump. In another preferred embodiment of the method, the ballast water stream is filtered prior to entering the treatment stream. In another embodiment of the method, hydrogen is separated from the treatment stream by a hydrocyclone separator.

In another embodiment of the method, the ballast water stream is sampled after the treatment stream is reintroduced into the ballast water to determine the chlorine concentration of the ballast water stream. The chlorine concentration of the ballast water stream is measured by a chlorine analyzer. The current in the hypochlorite electrolytic cells is adjusted in response to the measured chlorine concentration to increase or decrease the hypochlorite generated in the treatment stream to achieve the proper concentration of hypochlorite in the ballast water tank.

In one aspect of this method, residual chlorine in the ballast water stream is neutralized with sulfite downstream from the electrolytic cells before the treated ballast water is discharged into a new harbor. In another embodiment of this method, residual chlorine is rendered innocuous by mixing the ballast water with water having a BOD before releasing the mixture overboard. The BOD containing water can comprise seawater. In another aspect of the method, the water having BOD content is mixed with the ballast water by an eductor. In an alternative embodiment of the method, the ballast water and water having a BOD content are mixed by pumping BOD containing water into the ballast tank.

In an alternative method of this invention, ballast water is treated by drawing a ballast water stream onto a marine vessel, filtering the ballast water stream, and removing a portion of the filtered ballast water stream to form a treatment stream. The pressure of the treatment stream is increased. The treatment stream is then piped to hypochlorite electrolytic cells, where a current is applied to the cells to produce hypochlorite within the treatment stream. Hydrogen is separated from the treatment stream by a means for venting. The treatment stream is reintroduced into the ballast water stream. The ballast water stream is sampled after the treatment stream is reintroduced to determine the chlorine concentration of the ballast water stream. The current in the one or more hypochlorite electrolytic cells is adjusted in response to the measured concentration to increase or decrease the hypochlorite generated in the treatment stream. The treated ballast water stream can then piped to the ballast tanks. Finally, prior to discharge, residual chlorine is neutralized in the ballast water stream downstream from the one or more hypochlorite electrolytic cells with sulfite.

In one embodiment of the method, hydrogen is separated from the treatment stream by a hydrocyclone separator. Alternatively, the means for venting hydrogen can comprise venting the ballast water tanks to the atmosphere.

In another embodiment of the method, the step of neutralizing residual chlorine comprises piping the ballast water stream to a sulfite auxiliary system. The sulfite auxiliary system is positioned downstream from the ballast water tanks.

Alternatively, residual chlorine in the treated ballast water is neutralized in the ballast water stream downstream from the one or more hypochlorite electrolytic cells with a mean for mixing the ballast water with water having BOD content.

The water having BOD content can be seawater or any water containing live organisms. The means for mixing the ballast water with water having BOD content can be an eductor. In an alternative embodiment of the method, the means for mixing the ballast water with water having BOD content comprises a pump system adapted to pipe the water having BOD content to a mixing point adjacent to the ballast tank.

TEST EXAMPLES

EXAMPLE 1

Sodium Hypochlorite Mesocosm September 2004

The first test of the sodium hypochlorite generator/filtration treatment system was started on Sep. 3, 2004. The experiment included a chlorine/no filtration treatment and chlorine with filtration treatment. The target chlorination level was 4 mg/L. Initial chlorine levels for the filtered treatment were 3.5 mg/L and 2.95 mg/L without filtration.

There were 4 mesocosms (tanks) per treatment and 4 control mesocosms. The mesocosms were analyzed for Total Residual Oxidant ($Cl_2$ mg/L), culturable heterotrophic bacteria, chlorophyll a, and zooplankton at 5, 24, 48, 120, and 240 hours following treatment.

Procedure

Total Residual Oxidant

Total Residual Oxidant (TRO) was measured as $Cl_2$ using a Hach Spectrophotometer and Hach Colorimeter. DPD powder pillows were used for the analysis. TRO measurements were after the initial fill and at all of the time points listed above. The 1500-gallon tank of raw seawater was tested for bacteria levels before the start of the experiment. Water samples taken at the 5 time points were also tested for bacteria levels.

Culturable Bacteria

Bacteria colonies were cultured from known volumes of water to calculate colony-forming units (CFU) per liter of water. Colonies were cultured on petri dishes containing a growth medium suited for marine heterotrophic bacteria. The inoculated medium was analyzed for colony formation after a few days at room temperature incubation.

Chlorophyll a

Water samples were also taken for chlorophyll a analysis. Chlorophyll a is an indicator for the presence of live phytoplankton. A known volume of sample water was filtered through glass fiber filters with a pore size small enough to retain phytoplankton cells. The filters were frozen for later analysis in our Seattle laboratory. Chlorophyll a was extracted from the filters using acetone and then analyzed for fluorescence to determine the concentration in µg/L.

Mesozooplankton

Mesozooplankton were collected in Mystery Bay, using a 110 µm mesh net 1 meter diameter the morning of the test. Enough were collected to achieve approximately 150 mesozooplankton per liter. A Stempel pipette was used three times to collect a randomized 5 ml sample of the mesozooplankton "soup". The densities, counted using a dissecting scope, were used to calculate how much of the "soup" was needed for the 1500-gallon tanks to achieve 150 mesozooplankton per liter. The calculated amount of soup was poured into the tank and allowed to settle for at least an hour to let zooplankton acclimate. Three preliminary samples were collected out of the 1500-gallon tank after mixing. These were used to check calculation and to see the effects of the pumps. Sampling periods for mesozooplankton were 5, 24, 48, 120, and 240 hours. Samples were collected out of the 72-gallon mesocosms using a 1-liter Nalgene bottle after thoroughly mixing the contents of the mesocosm. Liter sample was filtered through a 73 µm sieve and placed in counting tray. Mesozooplankton counted were placed into one of eight generic categories and then by state; live, dead (absolutely no response to poking) or moribund (internal movement and no flight response to needle poke).

Results for Example 1

Figure 3:
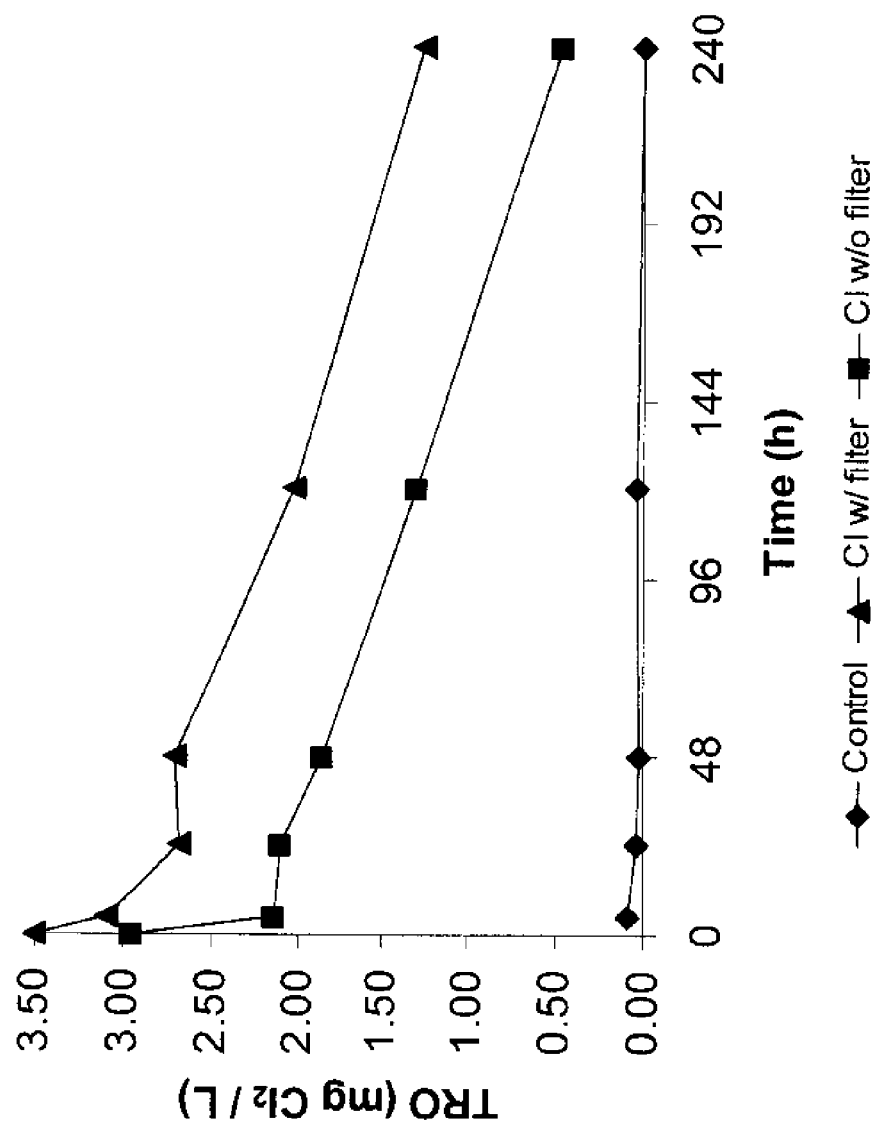
FIG. 3 is a chart showing the experimental results of treating ballast water with the system and method of this invention.

Total Residual Oxidant (TRO) levels declined steadily for the duration of the experiment. (FIG. 3). TRO in the nonfiltered test tanks dropped more than the filtered test tanks in the first 5 hours and then the TRO dissipated equally for the remaining time points.

Bacteria were greatly reduced in both treatments and showed minimal rebound over the 10 days of the experiment. There was a slight rebound of bacteria in the treatment without filtration.

Chlorophyll a is an indicator of phytoplankton. In the treated seawater, Chlorophyll a levels were at or below the detection limit starting with the 5-hour time point and continued to drop for both of the treatments In the control tanks, chlorophyll a levels declined over the duration of the experiment, likely due to the absence of light since all of the mesocosms were covered.

After the first treatment trial it was concluded that no statistical difference could be found between the two treatments, at all time points and states. The difference between the control and treatments was highly significant. Some mesozooplankton were still able to get through the 50 µm filter, all were dead except for 2 organisms.

EXAMPLE 2

Sodium Hypochlorite Mesocosm October 2004

The second test of the sodium hypochlorite generator/filtration treatment system was started on Oct. 12, 2004. Two experiments were performed. The first experiment compared two treatments, filtration/chlorination (~1.0 mg $Cl_2$/L) versus filtration only. The second experiment compared a chlorination dose of 1.0 mg $Cl_2$/L with a dose of 1.6 mg $Cl_2$/L. Each experiment included 4 mesocosms per treatment and 4 control tanks. The mesocosms were analyzed for Total Residual Oxidant (TRO) (mg $Cl_2$/L), culturable heterotrophic bacteria, chlorophyll a, and zooplankton at 5, 24, 48, and 240 hours following treatment. Culturable phytoplankton was enumerated in the first experiment. Samples were also collected at 5 hours for nutrient and total organic carbon (TOC) analysis. The temperature in the mesocosms fluctuated between 12.0° C. and 14.0° C.

Procedure

The procedure for Example 2 was the similar to the procedure used in Example 1 except for the phytoplankton technique.

Phytoplankton Most Probable Number Technique

During the first October experiment we tested the use of the Most Probable Number (MPN) technique, a dilution based culture method, to enumerate viable phytoplankton cells after treatment. Phytoplankton samples were collected from each treatment (control, filtered, and filtered and chlorinated) at four time points (5, 24, 48, and 240 hours). Each sample was filtered onto a glass fiber filter, and this filter (containing phytoplankton cells) was used to inoculate phytoplankton growth medium (f/2) over a dilution series. The inoculations were then transferred to incubators set to optimize growth (12:12 light:dark cycle, 13° C.). The pattern of growth over the dilution series allows for a calculation of the MPN, an estimate of the number of viable phytoplankton cells per L. Using this technique we can determine the effectiveness of a particular treatment at reducing the number of viable phytoplankton by comparing control and treatmentabundance estimates.

Results

Figure 4:
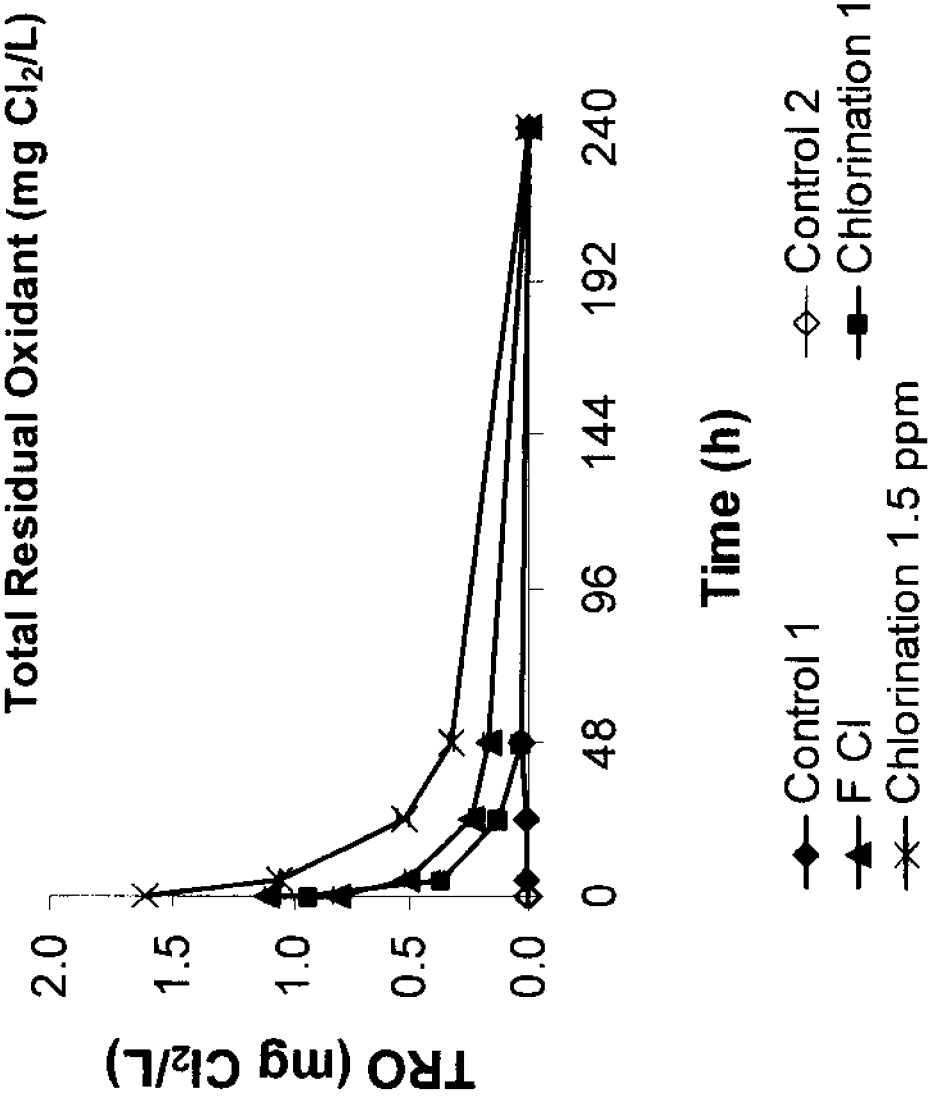
FIG. 4 is another chart showing the experimental results of treating ballast water with the system and method of this invention.

Total Residual Oxidant—The goal of the filtration with chlorination treatment was to dose to an initial TRO level between 0.5 and 1.0 mg $Cl_2$/L. The actual dose achieved had an average TRO of 1.11 mg $Cl_2$/L at the initial filling of the mesocosms (FIG. 4). This TRO declined 54% in the first 5 hours to a TRO of 0.51 mg $Cl_2$/L. TRO degradation slowed with time and completely disappeared by 240 hours. TRO for the chlorination only treatments of the second experiment showed a similar degradation curve. The goal of the chlorination only treatments was to dose with an initial TRO of 1.0 and 1.5 mg $Cl_2$/L. The actual dose averages were 0.94 mg $Cl_2$/L and 1.61 mg $Cl_2$/L TRO. Highest percent reduction of TRO occurred with the lowest TRO dose.

Culturable Bacteria were initially reduced in all 3 of the chlorinated treatments at 5 hours. Although slightly suppressed, bacteria in the chlorinated treatments rebounded to levels higher than the controls by 240 hours. The filtration only treatment showed negligible reduction in bacteria at 5 hours with levels equal to the control treatment at subsequent treatments.

Mesozooplankton—Chlorine plus filtration had an immediate effect upon the zooplankton, reaching a 95% mortality at 5 hours and complete mortality at 24 hours. By 48 hours the high chlorine treatment results were similar to the filtration with chlorination treatment. At 5 hours the filtration with chlorine treatment had no live organisms per L, there were only 1-2 moribund organisms per L at this time. The percent dead of the two controls were similar except for the 48 hours sample.

Chlorophyll a is an indicator of phytoplankton biomass. The filtration with chlorination treatment showed the greatest initial reduction in chlorophyll a compared with the chlorination only treatments. At 5 hours chlorophyll a levels were reduced by 98% for the filtration with chlorination treatment when compared to the control treatment. The filtration only treatment showed slight reduction when compared with the control treatment. In the control tanks, chlorophyll a declined over the duration of the experiment, likely due to the absence of light since all of the mesocosms were covered.

The phytoplankton culture (MPN) technique shows that the number of viable phytoplankton cells was greatly reduced by filtration compared to the control. Some of the inoculations showed positive growth over the entire series of dilutions, thus allowing us to only estimate the MPN as greater than or equal to result. It appears that filtration removes as much as 50% of the viable phytoplankton from the mesocosms. The reduction of viable phytoplankton was more dramatic when water was treated with the combined filtration and chlorination system. Numbers of viable phytoplankton were reduced 99% by this treatment compared to the control.

Although the present invention and its advantages have been described in detail, it should be understood that various changes, substitutions and alterations can be made herein without departing from the spirit and scope of the invention as defined by the appended claims.

The invention claimed is:

1. A system for treating ballast water, the system comprising:
   one or more ballast water tanks;
   a main ballast water stream that feeds the one or more ballast tanks;
   a side stream of ballast water removed from the main ballast water stream;
   one or more hypochlorite electrolytic cells in fluid communication with the side stream of ballast water;
   a means for venting hydrogen produced by the electrolytic cells into the atmosphere; and
   a sulfite auxiliary system in fluid communication with the ballast water tank to neutralize residual chlorine.

2. The system of claim 1 further comprising piping, the piping adapted to transport ballast water to one or more ballast tanks, and side stream piping in fluid communication with the piping, the side stream piping adapted to transport a portion of the ballast water to and from the one or more hypochlorite electrolytic cells.

3. The system of claim 2 further comprising a booster pump connected to the side stream piping upstream from the one or more hypochlorite electrolytic cells to increase the pressure of water piped through the side stream.

4. The system of claim 2 further comprising a booster pump connected to the side stream piping downstream from the one or more hypochlorite electrolytic cells to increase the pressure of water piped through the side stream.

5. The system of claim 1 wherein the hypochlorite electrolytic cells are adapted to electrolyze seawater.

6. The system of claim 1 further comprising a chlorine analyzer in fluid communication with the side stream of ballast water.

7. The system of claim 4 wherein the chlorine analyzer comprises a sampling unit to measure the amount of chlorine in the ballast water and a signal unit to emit an electrical signal to the one or more electrolytic cells to modulate hypochlorite production.

8. The system of claim 1 wherein the means for venting hydrogen to the atmosphere comprises a hydrogen separator.

9. The system of claim 1 further comprising a filter connected to the piping upstream from the side stream leading to the one or more hypochlorite electrolytic cells to filter water prior to entering the one or more hypochlorite electrolytic cells.

10. The system of claim 1 wherein the sulfite auxiliary system to neutralize residual chlorine is conformed to be positioned downstream from the ballast tanks.

11. The system of claim 1 wherein the sulfite auxiliary system comprises a sulfite tank, a pump and a sulfite analyzer.

12. The system of claim 1 wherein the sulfite auxiliary system comprises one or more sulfite chemicals selected from a group consisting of sulfur dioxide, sodium bisulfite, and sodium sulfite.

13. A system for treating ballast water comprising:
   one or more hypochlorite electrolytic cells;
   a means for venting hydrogen produced by the one or more electrolytic cells;
   piping adapted to transport ballast water to one or more ballast tanks, and side stream piping in fluid communication with the piping, the side stream piping adapted to transport a portion of the ballast water to and from the one or more hypochlorite electrolytic cells;
   a booster pump connected to the side stream piping to increase the pressure of water pipe through the ballast treatment system; and
   a sulfite auxiliary system in fluid communication with the ballast tank to neutralize residual chlorine in the ballast water.

14. The system of claim 13 wherein the means for venting hydrogen comprises a vent in the ballast tank.

15. The system of claim 13 further comprising a means for measuring chlorine within the ballast water.

16. The system of claim 13 wherein the sulfite auxiliary system is positioned downstream from the one or more hypochlorite electrolytic cells.

17. The system of claim 13 wherein the sulfite auxiliary system comprises one or more sulfite chemicals selected from a group consisting of sulfur dioxide, sodium bisulfite, and sodium sulfite.

18. A system for treating ballast water on a marine vessel comprising:
   one or more hypochlorite electrolytic cells, piping adapted to transport ballast water onto a marine vessel, and side stream piping in fluid communication with the piping, the side stream piping adapted to transport a portion of the ballast water to and from the one or more hypochlorite electrolytic cells;

a booster pump connected to the side stream piping to increase the pressure of water piped through the ballast treatment system;

a means for venting hydrogen produced by the electrolytic cells to the atmosphere;

one or more ballast water tanks in fluid communication with the piping; and a sulfite auxiliary system in fluid communication with the one or more ballast water tanks.

19. The system of claim 18 wherein the sulfite auxiliary system feeds sulfite to the ballast water tanks.

20. The system of claim 18 wherein the sulfite auxiliary system feeds sulfite to the piping downstream from the ballast water tanks.

21. The system of claim 18 wherein the sulfite auxiliary system comprises a sulfite tank in fluid communication with a metering pump.

22. The system of claim 18 wherein the sulfite auxiliary system comprises one or more sulfite chemicals selected from a group consisting of sulfur dioxide, sodium bisulfite, and sodium sulfite.

23. A method for treating ballast water comprising:
(a) drawing a ballast water stream into one or more ballast tanks;
(b) removing a portion of the ballast water stream to form a treatment stream;
(c) piping the treatment stream to one or more hypochlorite electrolytic cells;
(d) applying a current to the one or more hypochlorite electrolytic cells to produce hypochlorite within the treatment stream;
(e) separating the resulting hydrogen from the treatment stream;
(f) reintroducing the treatment stream to the ballast water stream;
(g) measuring the chlorine content within the ballast water stream;
(h) de-chlorinating the ballast water prior to discharge with sulfite;
(i) measuring the sulfite content in the effluent from the ballast water tanks to determine if residual chlorine is present; and
adding sulfite to the ballast water tank effluent if residual chlorine is present.

24. A method for treating ballast water comprising:
(a) drawing a ballast water stream into one or more ballast tanks;
(b) removing a portion of the ballast water stream to form a treatment stream;
(c) piping the treatment stream to one or more hypochlorite electrolytic cells;
(d) applying a current to the one or more hypochlorite electrolytic cells to produce hypochlorite within the treatment stream;
(e) separating the resulting hydrogen from the treatment stream;
(f) reintroducing the treatment stream to the ballast water stream; and
(g) de-chlorinating the ballast water with sulfite prior to discharge.

25. The method of claim 24 further comprising the step of increasing the pressure of the treatment stream with a pump.

26. The method of claim 24 wherein the ballast water stream is filtered prior to the removal of the treatment stream.

27. The method of claim 24 where hydrogen is separated from the treatment stream by a hydrogen separator.

28. The method of claim 24 wherein the ballast water stream is sampled after the treatment stream is reintroduced into the ballast stream to measure the chlorine concentration of the treated ballast water stream.

29. The method of claim 28 wherein the chlorine concentration of the of the ballast water stream is measured by a chlorine analyzer and the current in the one or more hypochlorite electrolytic cells is adjusted in response to the measured chlorine concentration to increase or decrease the hypochlorite generated in the treatment stream.

30. The method of claim 24 wherein the step of de-chlorinating the ballast water with sulfite comprises neutralizing any residual chlorine in the ballast water stream with sulfite downstream from the one or more hypochlorite electrolytic cells.

31. The method of claim 24 wherein the step of de-chlorinating the ballast water with sulfite comprises neutralizing any residual chlorine in the ballast water stream by piping sulfite chemical directly into the ballast water tank to de-chlorinate the ballast water prior to discharge.

32. The method of claim 24 wherein the electrolytic cell uses seawater to generate hypochlorite in the treatment stream.

33. The method of claim 24 wherein the step of de-chlorinating the ballast water with sulfite comprises adding one or more sulfite chemicals to the ballast water, the sulfite chemicals selected from a group consisting of sulfur dioxide, sodium bisulfite, and sodium sulfite.

34. A method for treating ballast water comprising:
(a) drawing a ballast water stream on board a vessel;
(b) filtering the ballast water stream;
(c) removing a portion of the filtered ballast water stream to form a treatment stream,
(d) increasing the pressure of the treatment stream;
(c) piping the treatment stream to one or more hypochlorite electrolytic cells;
(d) applying a current to the one or more hypochlorite electrolytic cells to produce hypochlorite within the treatment stream;
(e) separating the resulting hydrogen from the treatment stream by a means for venting;
(f) reintroducing the treatment stream to the ballast water stream; and
(g) neutralizing residual chlorine in the ballast water stream downstream from the one or more hypochlorite electrolytic cells with sulfite.

35. The method of claim 34 wherein the step of neutralizing residual chlorine comprises piping the ballast water stream to a sulfite auxiliary system, the sulfite auxiliary system positioned downstream from the ballast water tanks.

36. The method of claim 34 wherein the step of neutralizing residual chlorine comprises adding one or more sulfite chemicals to the ballast water, the sulfite chemicals selected from a group consisting of sulfur dioxide, sodium bisulfite, and sodium sulfite.

* * * * *